Oct. 13, 1942.  E. A. ROCKWELL  2,298,512
ACCUMULATOR FOR SUPPLYING LIQUID UNDER PRESSURE
Original Filed Oct. 15, 1936  7 Sheets—Sheet 1

INVENTOR
Edward A. Rockwell
BY
Arthur Wright
ATTORNEY

Oct. 13, 1942.  E. A. ROCKWELL  2,298,512
ACCUMULATOR FOR SUPPLYING LIQUID UNDER PRESSURE
Original Filed Oct. 15, 1936   7 Sheets-Sheet 3

Oct. 13, 1942.  E. A. ROCKWELL  2,298,512
ACCUMULATOR FOR SUPPLYING LIQUID UNDER PRESSURE
Original Filed Oct. 15, 1936   7 Sheets-Sheet 4

Fig. 6.

INVENTOR
Edward A. Rockwell
BY
Arthur Wright
ATTORNEY

Oct. 13, 1942. E. A. ROCKWELL 2,298,512
ACCUMULATOR FOR SUPPLYING LIQUID UNDER PRESSURE
Original Filed Oct. 15, 1936 7 Sheets-Sheet 5

Oct. 13, 1942.  E. A. ROCKWELL  2,298,512
ACCUMULATOR FOR SUPPLYING LIQUID UNDER PRESSURE
Original Filed Oct. 15, 1936    7 Sheets-Sheet 7

INVENTOR
Edward A. Rockwell
BY
Arthur Wright
ATTORNEY

Patented Oct. 13, 1942

2,298,512

UNITED STATES PATENT OFFICE 2,298,512

ACCUMULATOR FOR SUPPLYING LIQUID UNDER PRESSURE

Edward A. Rockwell, Hartford, Conn.

Original application October 15, 1936, Serial No. 105,679. Divided and this application December 1, 1939, Serial No. 307,118

10 Claims. (Cl. 103—222)

My invention relates particularly to an apparatus involving a pressure accumulator, by means of which the liquid may be accumulated under pressure in an advantageous manner to provide a source of power therewith, and while it is applicable to sources of power generally it has especial application as a source of power in connection with automotive vehicles, as, for example, automobiles, and the operation of any and all accessories thereon.

The present application is partly a continuation of my U. S. Patent No. 2,136,638, granted November 15, 1938, upon Electro flow power supply system, and a division of my application upon Pressure accumulator apparatus, Ser. No. 105,679, filed October 15, 1936, patented April 23, 1940, No. 2,197,772.

The object of my invention is to provide an accumulator apparatus by means of which liquid may be stored under a high pressure from a pumping unit, which may be driven, if desired, with only a small electric motor and pump and which need be operated only a portion of the time so that there is only a small drag on the electric battery accordingly. A further object of my invention is to provide an effective filtering of the liquid pressure medium. Still another object is to provide efficient means for controlling the electric current drive of the electric motor. In an improved form of my invention the object is, furthermore, to locate the controlling switch of the electric motor outside of the body of pressure liquid to avoid electrolytic action and dispersion of metal therein, also to avoid wear on the said switch. Still another object is to provide such an accumulator apparatus so constructed as to occupy a minimum amount of space in view of the limited space available for the same on the automobile chassis, and especially to reduce as far as possible the length of the entire apparatus. Again, another object is to locate the seals in the plunger-operated switch so as to avoid scoring by accumulated dirt thereon. Further objects of my invention will appear from the detailed description of the same hereinafter set forth in the several embodiments of my invention in the accompanying drawings, in which—

In the drawings, referring first to Figs. 1 to 4, which comprise subject matter divided out from my copending application above referred to, the low pressure return liquid, after having been utilized for the operation of any desired mechanism, as for example an automotive accessory, is admitted by a low pressure port 1 to a pressure accumulator and supply reservoir 2 which is made of thin metal. The supply reservoir 2 is mounted upon a pump casing 3 and is supported by a bracket 4 between rubber washers 5 on screws 6 screwed to the pump casing 3. The bracket 4 is secured on the chassis. The low pressure liquid passes from the port 1 through a filter-supporting head 7 having a slitted flange 8 to hold tight against the inner face of the casing 2 an annular cloth 9, the rear end of which passes around a ring 10 supported beyond the filter head 7. The other end of the filter cloth 9 is supported by a ring 11 against a flanged disk 12. The disk is secured against the pump housing 3 by means of six screw-threaded rods 13. The rear ends of said rods support the head 7 between nuts 14 on the rods 13. The rods 13, furthermore, support against the face of the nuts 14 a plurality of washers 15, the nuts 14 serving to clamp between said washers 15 and the disk 12, a plurality of tubes 16 which serve not only to space the washers 15 away from the disk 12 but also to keep the filter cloth 9 taut and, furthermore, to act, together with the rods 13, as guides for maintaining the alignment of the six accumulator springs 17, each of which surrounds a tube 16. The springs 17 are provided to accumulate stored pressure in the reservoir 2 by their further compression, it being understood, furthermore, that the springs 17 are piled into the reservoir initially under great pressure so that when these springs are further compressed to the maximum within the reservoir 2 they will exert upon the liquid a pressure, for example, of 500 lbs. per square inch, which is the stored pressure under which the apparatus preferably operates in supplying the liquid under pressure in the operation of the system. The liquid, after passing through the filter cloth 9, will enter a return passageway 18 in the pump casing 3 and will thence pass through a low pressure return inlet 19 to the pump which is driven by an electric motor 20 having a shaft 21 arranged to be connected by a driven sleeve 22 having a slot 23 with a pump shaft 24 having a tongue 25 at the forward end thereof. The pump shaft 24 is connected at its other end by a rearward tongue 26 with an auxiliary pump shaft 27. On the shaft 24 there is a forward end plate 28 having a central port 29 which is situated just in the rear of a sealing ring 30 of the same rubber as hereinabove referred to, and which is positioned on the shaft 24 by a retaining plate 31. The end plate 28 has four screws 32 therein for clamping the same to a central stationary pump member 33 into which they are screw-threaded. Between the end plate 28 and the pump member 33 there is a gear housing 34 having a recess 35 for pump gears 36 and 37, the gear 36 being doweled on the end of the shaft 24. Between the pump member 34 and the end plate 28 there is a spacing member 38 which has a radial passageway 39, conveying any oil away from the opening 29 and thence by a peripheral passageway 40 to the inlet port 19 so that the incoming oil is supplied from the port 19 through a radial port 41 in the central member 33 to one side of the gears 36 and 37, by the rotation of which the liquid is discharged from the other wire of said gears through an inclined passageway 42, also in the central pump member 33 to one side of a pair of gears 43 and 44 located in an opening 45 in a pump member 46, one of which is tight on the auxiliary shaft 27. The liquid passes from the outlet side of the gears 43 and 44 into a passageway 48 in a spacing member 49 located around the shaft 27 and which is clamped to the central pump member 33 by screws 32 which pass through a rear end plate 51. The liquid under pressure, after passing through the passageway 48, proceeds in a radial direction through a slot 52 in the end plate 51 and thence into an annular passageway 53 around the same, so that the liquid at this point may take a double path, one path being forwardly through a peripheral port 54 in the spacing member 49 and thence through a port 55 in the member 46 and a passageway 56 to an impact cushion-chamber 57 in a removable dome 58 on the pump casing 3, to relieve the initial starting torque, but the main flow of the liquid passes around the outer periphery of the end plate 51 and thence past an annular rubber seal 59 which is retained in an annular recess 60 on a rearward extension of the end member 51. The liquid thus discharged around the annular rubber ring 59 is received in a pressure reservoir 61 in the pump casing 3 from which it is supplied through an outlet port 62 by a flexible tube 63 to any point where the pressure liquid is to be utilized. The pressure built up in the chamber 61 by the rotation of the gears 36 and 37, 43 and 44, is communicated to a piston 65, having on its face a sealing ring 66 of the same rubber material in the pressure reservoir 61, which piston carries a compression plate 67 thereon inside the casing 2.

The compression plate 67 supports the forward ends of the springs 17. Thus, as the pressure accumulates in the chamber 61 the compression plate 67 is gradually pushed to the rear until a Bakelite circuit breaker 68, secured to the piston 65, breaks the electrical circuit which drives the motor 20. For this purpose the circuit breaker 68 is brought into contact at the rear part of its path of movement with a button 69 on the end of a slidable sleeve 70, which is secured thereto by a rivet 71 which also passes through a stop sleeve 72 on the outside of the sleeve 70, which in turn is supported in the end of the casing 2 by a Bakelite plug 74 and Bakelite and metallic washers 75 and 76, as well as nuts 77 and 78 between which the end of a circuit wire 79 is clamped. It will be noted that on the screw-threaded end of the rod 73, in front of the Bakelite plug 74, there is a Bakelite washer 79a, a washer 80 and a nut 81 which serve to clamp in place two grounded contact arms 82 and 83 which have leaf springs 84 and 85, respectively, above the same. The inner ends of these contact arms 82 and 83 carry rollers 86 and 87, respectively, which are arranged to ride on the squared face of a slidable conducting sleeve 88 mounted on the sliding sleeve 70. At its forward end the conducting sleeve 88 has a flange 89 and next to it a mica disk 90 acting as a spark arrester and in front of this a Bakelite non-conducting sleeve 91, also squared, and having a limiting flange 92 at its forward end similar in shape to a limiting flange 93 at the rear end of the sleeve 88. At the rear of the flange 93 there is a spring housing 94 which contains a slight spring 95 around a stop sleeve 96, the rear end of the spring 95 being supported against a flanged disk 97, on the other side of which there is a stronger spring 98 resting against the washer 80. At the forward end of the sleeve 70 there is a spring housing 99 which encloses a light spring 100. This arrangement is such that when the circuit breaker 68 pushes the button 69 to the rear, this direction of movement will continue until the rear end of the sleeve 72 reaches the rear portion of the spring housing 99 and thereafter the slight added push on the button 69 will cause the rollers 86 and 87 to snap onto the non-conducting sleeve 91 through the action of the spring 100. The spring 100 of itself is not strong enough to snap the rollers 86 and 87 onto the non-conducting ring 91. In the reverse movement, after the circuit breaker 68 has released the button 69, when the liquid pressure is low enough to permit this forward movement of the circuit breaker 68, the spring 98 moves the sleeve 96 forwardly until it contacts with the forward end of the spring housing 94, whereupon a slight added push will induce the spring 95 to snap the rollers 86 and 87 into the position shown in Fig. 3. The circuit arrangement, including the electric motor 20 and the switch just described, comprises a battery 101, one side of which is connected to the ground 102 and the other side of which is connected by a wire 104 to one pole 105 of the motor 20. The wire 79 leads to the remaining pole 106 of the motor 20. Preferably, also, this pole 106 is connected by a wire 107 to a dash light 108 connected by a wire 109 to the wire 104, so that whenever the current is being supplied to the motor 20, due to the lightened pressure in the liquid, the dash light 108 will be illuminated. Inasmuch as only very little liquid is utilized in the operation of the accessory there is only a very little drop in the pressure at any time, and, therefore, the dash light 108 will only be illuminated at infrequent intervals. In the operation of this form of my invention the low pressure liquid will pass into the reservoir 2 and thence through the filter cloth 9, which will remove all the accumulated scale and dirt, and thereafter enter the pump, from which, when the current is on, that is to say when the circuit breaker 68 is in its forward position due to the decrease of pressure in the reservoir 61, the rotation of the pump will rapidly build up the pressure so as to further compress the springs 17 until the circuit is again broken by the rollers 86 and 87, passing onto the Bakelite sleeve 91. While the current is on, the dash light 108 will show up but as soon as the current is broken it will, of course, cease to be lighted.

Figure 15:
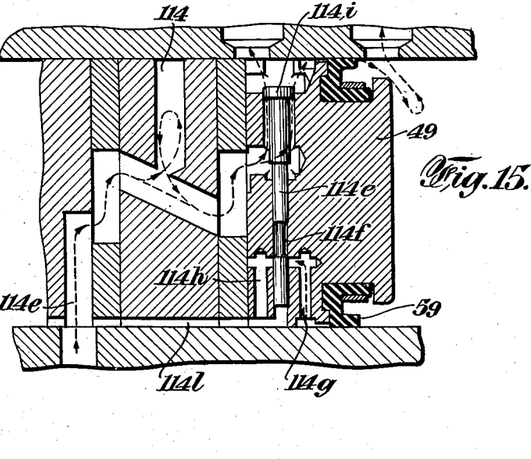
Fig. 15 is a section of the same taken on line 15—15 of Fig. 14.

In the modified form of my invention as shown in Figs. 5 to 8, certain features, including the accumulator, have been changed somewhat. However, the construction is the same as in the form in the preceding figures except in the following respects: In this instance the motor shaft 22 is connected by a universal joint 109 of any conventional construction, to the pump shaft 24. In this instance, furthermore, there is a modified form of accumulator plunger 110 which, in order to avoid scoring of the plunger by accumulated dirt, has a liquid seal 111 at the right-hand end of said plunger and which, at its extreme right-hand end, is provided with a clearance 112 for the same purpose located around a flange 112a spaced from the adjacent enclosing wall. It will be noted that this plunger 110 operates in a cylinder 113 which in this instance, to avoid undue length of the apparatus, extends into the interior of the supply reservoir, said cylinder being located within a pump casing 114 suitably constructed for this purpose. It will be noted that the pump casing 114 has a flange 114a for attaching it to a motor casing 114b to shorten up the assembly. In this instance, furthermore, it will be noted that in the pump there is a low pressure intake 114c which is located to the left of the first gear cavity. Also, as shown in Fig. 15, there is a dome 114d drilled into the central stationary pump member connecting with the liquid passageway therein to balance the pulsations between the first and second gear cavities. Furthermore, in this instance I have provided an unloader valve 114e in the discharge passageway from the spacing member at the right-hand end of the pump. The said unloader valve is provided with a constricted portion 114f which is adapted to unload the pressure on the outlet from the pump when the flow drops to a predetermined minimum rate by establishing communication between a passageway 114g and an equalizing passageway 114h leading through the low pressure inlet to the pump. The lower end of the unloader valve 114e cuts off communication between said passageways when the flow of the fluid is sufficient, by acting on a piston head 114i of the unloader valve to hold the valve in its uppermost position against the pressure of the pumped fluid. In other words, when the pressure drops, that is when the motor is cut off, the pressure of the trapped fluid will push the unloader valve 114e down, where it will establish communication between passageways 114g and 114h. Thus, when the accumulator switch cuts in the electric motor will, therefore, start with no load as it will have to obtain sufficient speed to create enough flow to lift the unloader valve against the pressure. Within the plunger 110 there is a central recess 115 to receive a hexagonal rod 116 to enable it to be held from turning when the apparatus is being assembled, the same being adapted to receive in its end a screw 117 for holding in place a dished spring retainer 118 which extends around the outside of the cylinder 113 for retaining the springs 17 in place at one end thereof. The said screw 117 is carried in a narrow extension 119 of the said hexagonal rod 116, the outside of which extension is screw-threaded and carries thereon a lock washer 120 and a nut 121. A lock washer 122 is carried around the screw 117 at the end of the reduced extension 119. The said screw 117, furthermore, has a head 123 with a central slit 124 to receive loosely therein a tongue 125 of a switch operating rod 126, said tongue being held loosely in place to allow slight lateral movement of the switch operating rod 26 by means of a pin 127. On the head 123 of the said screw there is carried a spring housing 128 which is held in place thereon by a snap-ring 129 and adjacent to the face of the said head 123 there is a washer 130 against which one end of a spring 131 rests. The said spring 131 is located around a stop sleeve 132, the right-hand end of which acts as a stop in cooperation with the inturned end of the spring housing 128 in the operation of the switch. The said switch operating rod, furthermore, carries movably thereon a hardened steel-block 133 having brazed to the right-hand end thereof a switch-operating sleeve 134 and there is located around the periphery of the block a tapered annular flange 135 for cooperating with a plurality of rollers 136 which are carried, respectively, on arms 137 supported on pivots 138 on an end casting 139, which also is provided with lugs 140 for supporting springs 141 bearing against the said levers 137 to press them inwardly for snap action in cooperation with the said flange 135. Within the switch operating sleeve 134 there is another spring housing 142 having within the same a spring 143 and held in place by a snapring 144 against a spring retaining washer 145 which rests against a head 146 on the rod 126. The said spring 143 is held at its other end by an inturned inwardly directed portion of the sleeve 142. Within said spring there is, furthermore, a stop sleeve 147, the left-hand end of which acts as a stop in the compression of the said spring. The said casting 139 is arranged to receive five assembly bolts 148 which retain five accumulator compression springs 17 in place around the cylinders 16 by means of their screwthreaded ends 149 located in the pump casing 114. Lock nuts 150 fasten the said rods 148 in place. The right-hand ends of the said rods 148 have spring-retaining-disks 151 thereon which abut against nuts 152, which also serve to hold in place a filter-supporting perforated shell 153 for supporting a filter cloth 154, which filter cloth has at one end a sealing and retaining ring 155 and at the other end a similar retaining ring 156 which holds its end of the filter cloth in a recess 157 on a flange 158, which is also provided with a recess 159 for receiving the adjacent end of the shell 153. The said shell 153, at the right-hand end, is located against the casting 139 through which the rods 148 pass and on the other side of said casting the rods 148 have lock washers 160 and lock nuts 161. The outer ends of the rods 148 pass through the enclosing shell of the reservoir, the left-hand end of the shell being received against a gasket 162 in a recess on the pump housing 114 and against which it is held by nuts 163 and lock washers 164. There are five other screw-threaded rods 165 which are similar in every respect to the rods 148 except that they do not extend through the casting 139 but merely cooperate with the springs 17, the filter 153 and the pump housing 114. The enclosing shell, furthermore, has at its top a vent opening 166 which is closed by a vented receptacle 167 packed with horsehair and covered with a ribbed cap 168 to permit the passage of air between the ribs thereto. Furthermore, it will be noted that the right-hand end of the filter cloth 154 is held tightly against the inner face of the enclosing shell so that the incoming oil must pass through the end of the shell 153 and thence radially through the filter cloth.

On the right-hand end of the enclosing shell, around a central opening therein, there is supported a switch housing 169 by screws 170. This switch housing 169 has a plurality of oil ports 171 which communicate with an oil recess 172 having a rubber gasket 173 therein, U-shaped in cross-section, to seal a switch plunger 174 having an annular oil-carrying-recess 175, and on the left-hand end a push-plate 176 held in place by a screw 177. The said plate 176 is adapted to be operated by the switch operating sleeve 134. The rubber seal 173 rests against a backing piece 178 against which there is located a washer 179 held in place by a snap-ring 180 in the switch housing 169. Around the outside of the plunger 174 there is a stop snap-ring 181. The right-hand end of the plunger 174 rests against a conducting disk 182 which is supported in eyelet shaped rings 183 slidably carried on a plurality of studs 184 carrying coil springs 185 supported against heads 186 on said studs. The studs 184 are carried by a non-conducting plate 187 supported between Bakelite washers 188 by screws 189 from the switch housing 169. The said plate 187 carries thereon a contact ring 190 which is connected by a conductor 191 to a terminal 192 of the electric circuit, to which a wire 193 is connected. The terminal 192 is mounted in a switch cover 194 held in place by the screws 189 and from which it is suitably insulated in the usual way. On the switch cover 194 there is also located another terminal 195 to which the other wire 196 of the circuit is connected. The inner end of said terminal 195 is connected by a braided insulated wire 197 to a terminal 198 mounted on the Bakelite disk 182. It will be obvious that this form of my invention operates in substantially the same way as the form of my invention shown in Figs. 1 to 4. However, in this instance the plunger 110 will not be scored by dirt as the sliding portion thereof is located in the filtered fluid to the left of the rubber seal 111. Also, in this instance the switch, being located outside of the body of oil and being operated by the sleeve 134 and the push-plate 176 on the plunger 174, will not cause the deposition of metal electrolytically on the parts of the switch mechanism. Also, it will be seen that the switch may be more readily constructed and maintained in order because of its location and arrangement. Furthermore, the parts of the reservoir may be more readily constructed and assembled due to the absence of the flanges on the enclosing shell for attachment to the pump housing, as in the previously described form of my invention.

Figure 1:
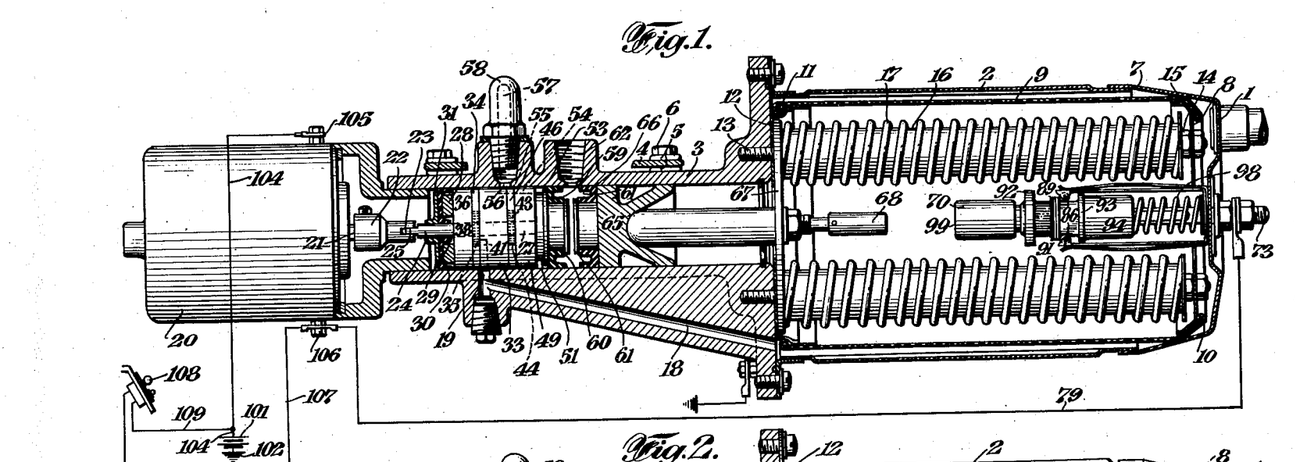
Fig. 1 is a vertical section of the accumulator and pump with attached motor in the position in which it is ready to accumulate pressure.
Figure 2:
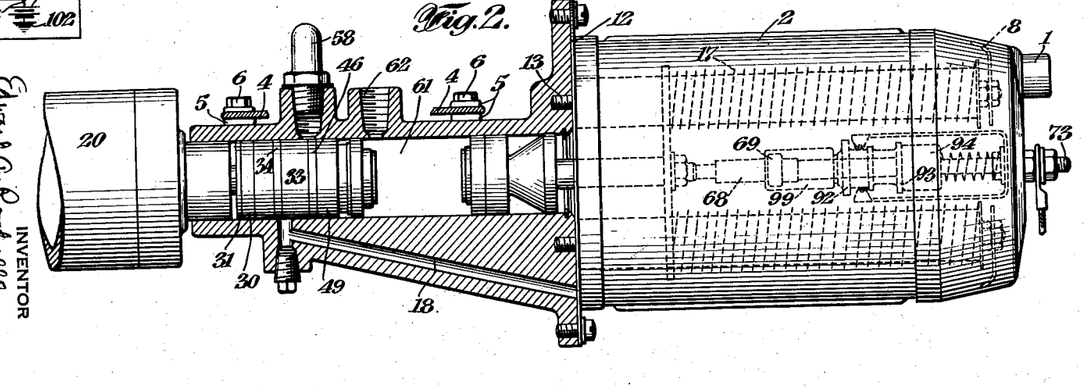
Fig. 2 is a similar view showing the accumulator with the pressure fully accumulated therein and the switch in the position in which it has broken the circuit supplying the motor.
Figure 3:
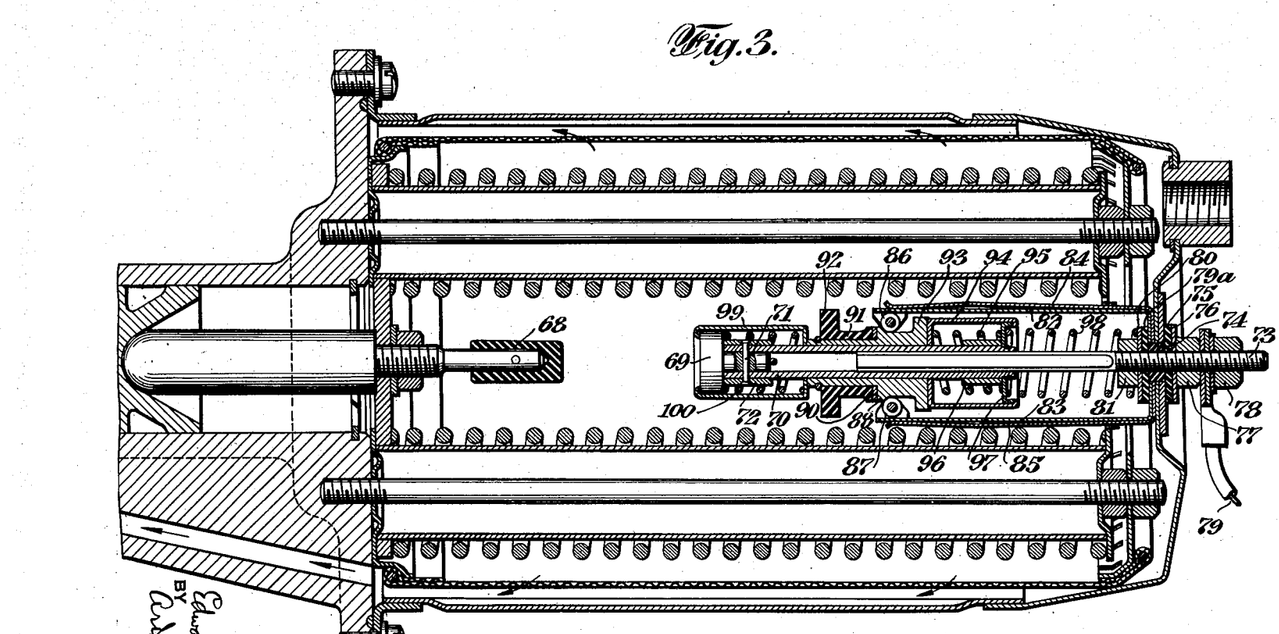
Fig. 3 is an enlarged vertical section of the accumulator shown in the preceding figures.
Figure 4:
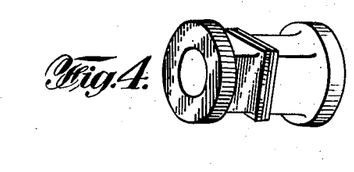
Fig. 4 is a perspective view of the switch sleeve therein.
Figures 5, 7:
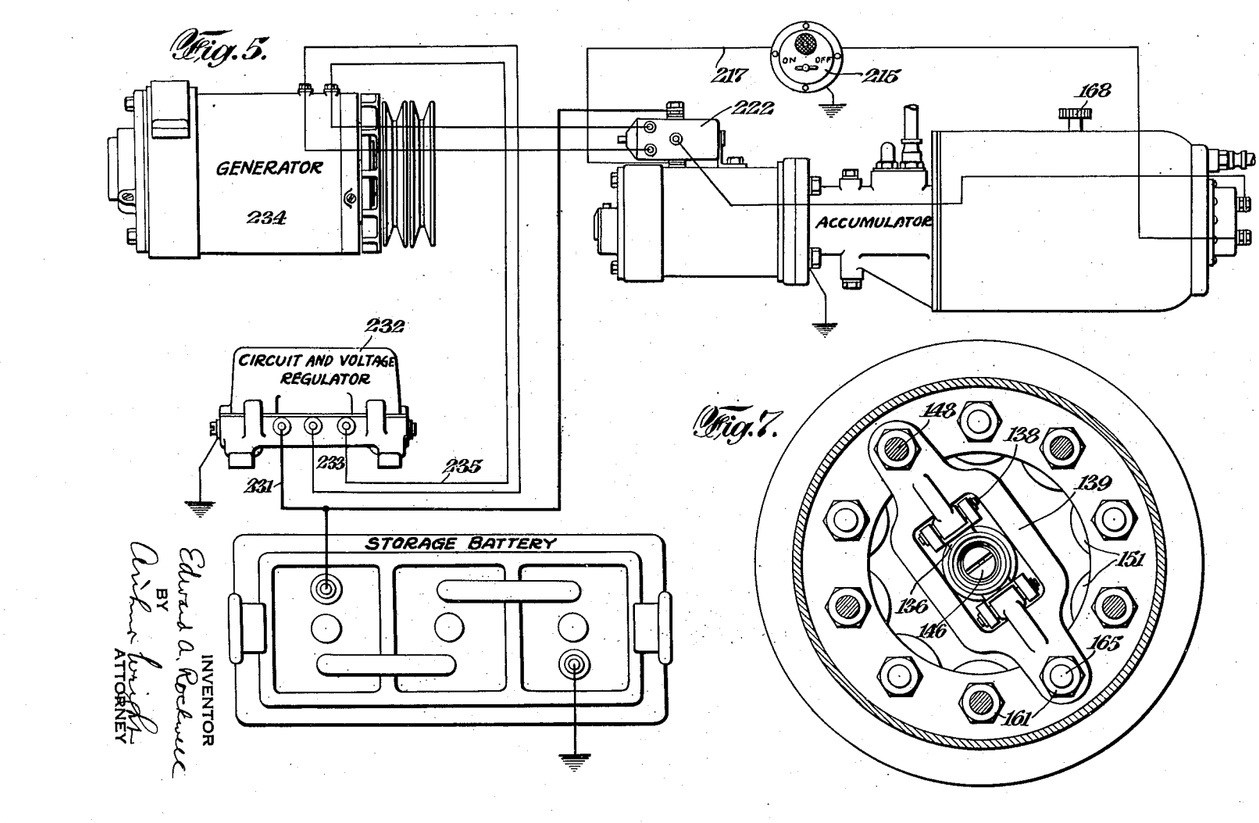
Fig. 5 is a diagrammatic view illustrating an assembly of the accumulator with the electric circuit for operating the electric motor and showing in elevation a modified form of my accumulator.
Fig. 7 is a vertical cross-section thereof taken on line 7—7 of Fig. 6.
Figure 6:
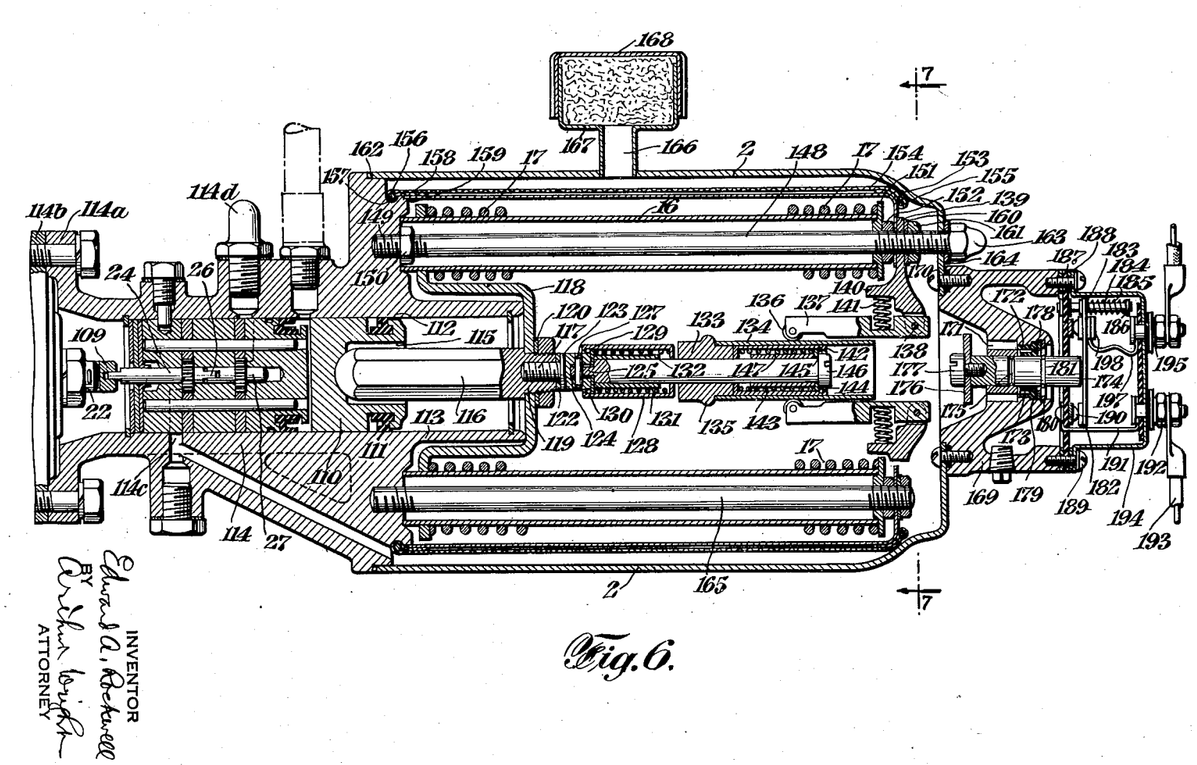
Fig. 6 is an enlarged vertical section of the form of accumulator shown in Fig. 5.
Figure 8:
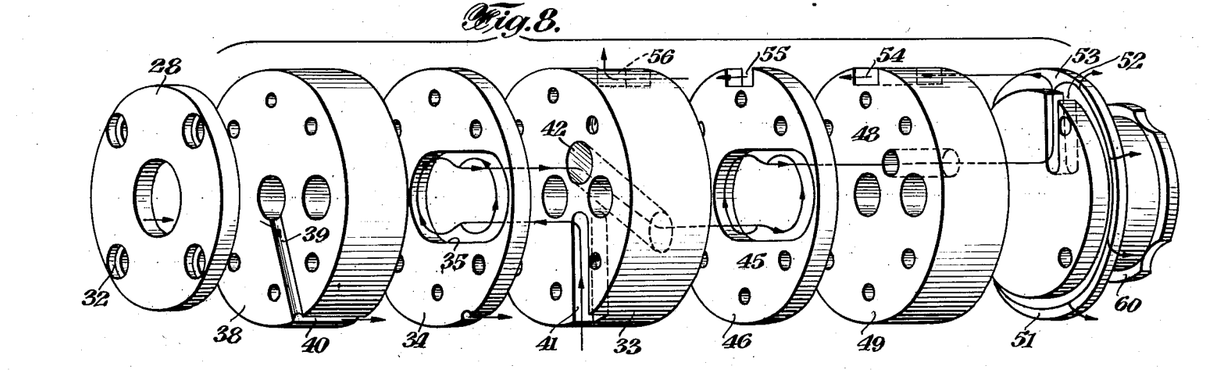
Fig. 8 is a view showing the details of the pump of Fig. 1.
Figure 9:
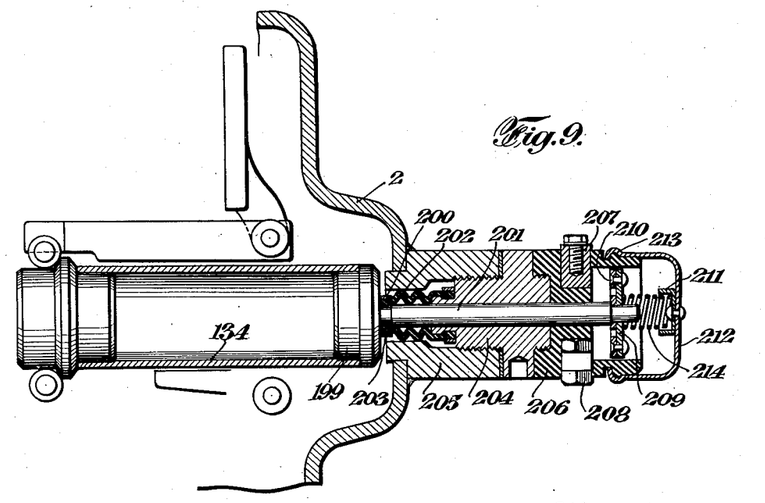
Fig. 9 is a vertical section of a modified form of controlling switch for the electric motor.

In the form of my invention shown in Fig. 9 there is a modified form of the switch in which sliding oil seals are obviated. The construction of the apparatus in this form of my invention is the same as that just described in connection with Figs. 5 to 8 except as follows: In this instance the switch operating sleeve 134 is provided at the right-hand end with a Bakelite button 199 which is adapted to cooperate with a head 200 on the end of a switch-operating plunger 201. Said plunger 201 carries adjacent to the head 200 one end of a rubber boot 202 which is fastened in place by snap rings 203, the other end of the said boot being similarly fastened in a screw-threaded hexagonal plug 204 through which the plunger 201 passes, said plug being screw-threaded in a casing 205 which is brazed into a hole at the end of the reservoir enclosing shell. Screw-threaded on the other end of the plug 205 there is a rubber or Bakelite terminal member 206 which carries two electric terminals 207 and 208 as the terminals of the switch. The extreme end of the said plunger 201 has loosely mounted on a reduced extension a Bakelite disk 209 having a bridging contact ring 210 secured to the periphery thereof, the disk 209 and plunger 201 being normally moved toward the left by a spring 210 carried in a spring pocket 211 riveted to an enclosing cap 212 which has a spring tongue 213 for holding the cap in an annular recess on the insulating terminal piece 206. The operation of the switch in this form of my invention is similar, because of its location, to the operation of the form of my invention shown in Figs. 5 to 8. However, in this instance the use of the boot 202 eliminates the necessity of sliding seals for the switch construction and the parts herein are much more simple and readily manufactured.

Figure 10:
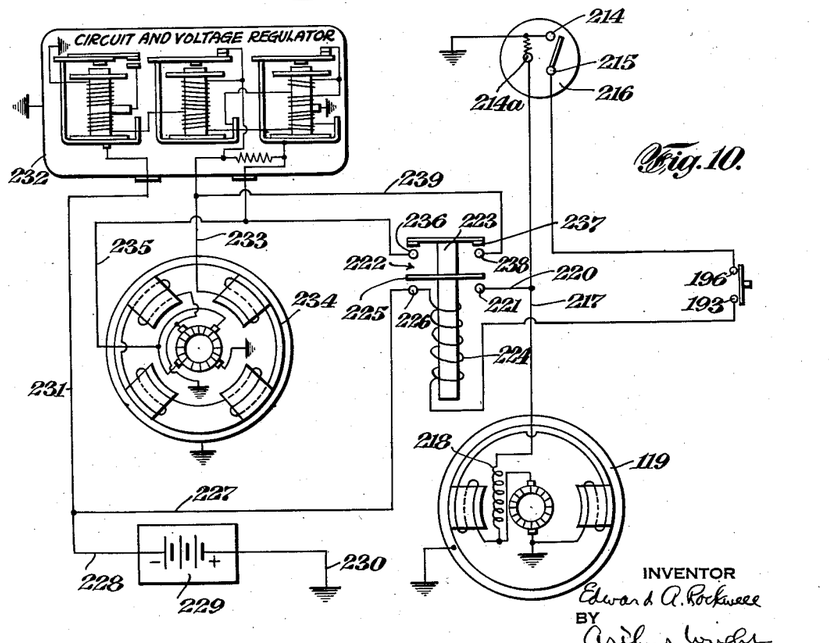
Fig. 10 is a diagrammatic detailed view showing the circuit arrangement for the said accumulators.

As shown in Fig. 10, the system may be provided with a circuit containing a magnetic switch permitting the operation initially of the pressure switch by a primary current of, for instance, seven amperes, and then when the magnetic switch cuts in to apply to the motor a greater ampere of about forty to fifty amperes. This magnetic switch may also have contacts for cutting out a standard current and voltage regulator at times and for brief intervals so as to secure the maximum current from the generator when needed. In this arrangement the terminal 196, for example, leads to switch terminals 214 and 215 on a dash panel 216 having a wire 217 thereon containing a lamp which in turn is connected to a series winding 218 of a compound motor 219 for driving the pump, the other terminal of the motor being grounded. The said wire 217 has a branch 220 leading to a terminal 221 of a magnetic switch 222 which is provided with a magnetically operated core 223 adapted to be operated by low voltage primary circuit windings 224 connected to the terminal 193. The said core carries a circuit closing plate 225 adapted to cut in a higher amperage to the motor, as shown, for bridging across the contact 221 and a contact 226 in the circuit with the windings 224, which in turn are connected by a wire 227 and a wire 228 to a storage battery 229, the other terminal of which has a ground 230. The said wire 227, furthermore, has a branch 231 which leads to a standard current and voltage regulator 232, the other terminal of which is connected by a wire 233 to the field of a generator 234, the armature thereof being connected by a wire 235 to a switch contact 236 adapted to be bridged by a contact plate 237 on the plunger 223 with a contact 238 connected by a wire 239 with the wire 233. By means of this magnetic switch, when needed, the entire current from the generator may be utilized by automatically cutting out the current from the current and voltage regulator, which can be done effectively for short intervals without damaging the generator.

Figure 11:
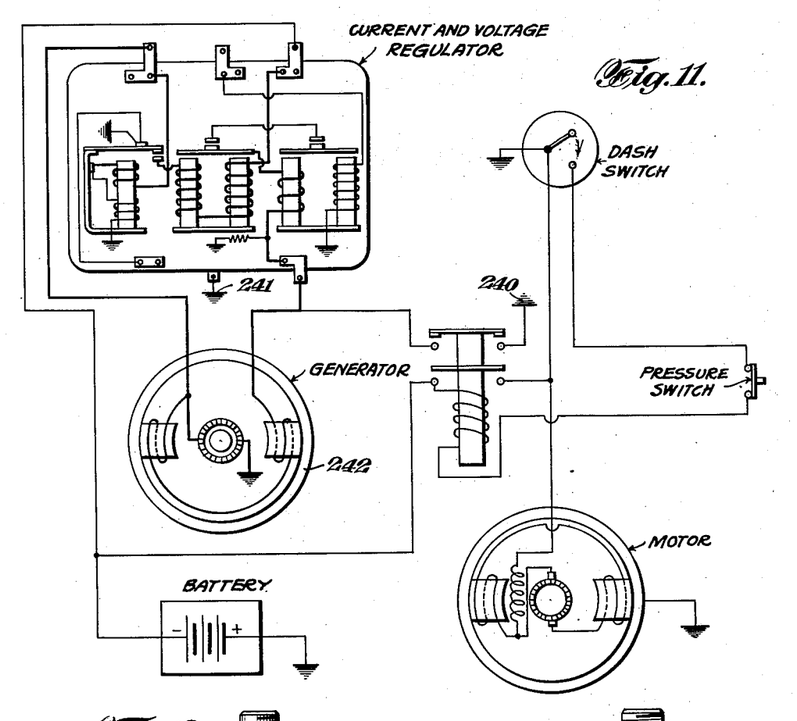
Fig. 11 is a diagrammatic view of a modified form of circuit arrangement for the same.
Figure 12:
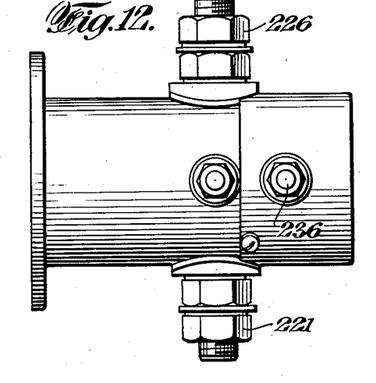
Fig. 12 is an elevation of the magnetic switch shown in Fig. 11.
Figure 13:
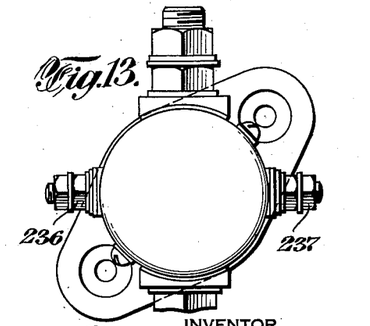
Fig. 13 is an end elevation of the same.
Figure 14:
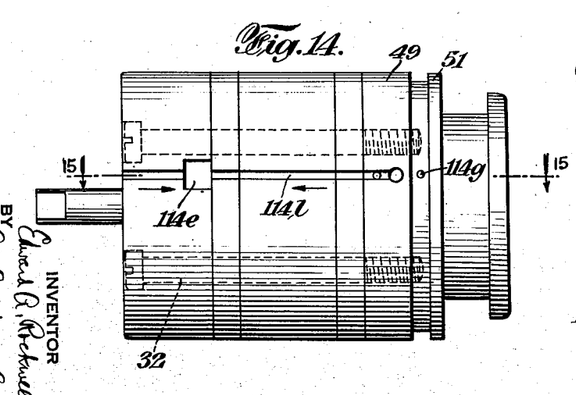
Fig. 14 is a plan view of the internal parts of the pump shown in Fig. 6.

The circuit arrangement in Figs. 11 to 13 is a modified form of the magnetic switch construction but in which the wiring is simpler for the reason that one of the terminals of the magnetic switch is grounded at 240 and the current and voltage regulator is grounded at 241. In this instance, also, a slightly different type of generator 242 is shown.

While I have described my invention above in detail I wish it to be understood that many changes may be made therein without departing from the spirit of the same.

I claim:

1. In an accumulator for accumulating and delivering accumulated pressure for the performance of work, in combination, a plurality of compressible elastic units adapted to apply accumulated pressure when said units are under compression, a movable wall connected to said units for compressing the same, tubular means for maintaining the alignment of the units throughout the length of said units in their low and high compression positions, end closures for the tubular means fastened thereto, adapted to act as supports for said elastic units and fluid pressure supplying apparatus adapted to receive fluid and deliver it under pressure by means of the pressure accumulated by said units.

2. In an accumulator for accumulating and delivering accumulated pressure for the performance of work, in combination, a plurality of compressible elastic units adapted to apply accumulated pressure when said units are under compression, a movable wall connected to said units for compressing the same, tubular means for maintaining the alignment of the units throughout the length of said units in their low and high compression positions, end enclosures for the tubular means fastened thereto, adapted to act as supports for said elastic units and fluid pressure supplying apparatus adapted to receive fluid and deliver it under pressure by means of the pressure accumulated by said units, comprising a piston connected to said units for delivering said fluid under pressure.

3. A pressure accumulator, comprising a series of coil springs located side by side, tubular means for maintaining the alignment of the springs throughout their lengths, end enclosures for the tubular means fastened thereto, adapted to act as supports for said springs, a common plate for the support of the springs, and a piston attached to said plate.

4. In combination, a casing having a chamber therein, adapted to contain a fluid under pressure, a cylindrical stationary closure for one side of the chamber, having an inlet passageway and a circular extension, an annular resilient sealing member supported on said extension, having a cylindrical flange adapted to allow the passage of the fluid into said chamber but to seal the closure by the pressure of the fluid in said chamber, a piston on the other side of said chamber, and means associated with the piston for accumulating the pressure in said chamber.

5. In combination, a casing having a chamber therein, adapted to contain a fluid under pressure, a cylindrical stationary closure for one side of the chamber, having an inlet passageway and a circular extension, an annular resilient sealing member supported on said extension, having a cylindrical peripheral flange adapted to allow the passage of the fluid into said chamber but to seal the closure by the pressure of the fluid in said chamber.

6. In combination, a casing having a chamber therein, adapted to contain a fluid under pressure, a piston for the chamber, one side of which is adjacent to the fluid under pressure, having a circular extension on the side of said piston adjacent to said chamber, an annular resilient sealing member supported on said extension, having a cylindrical flange adapted to seal the piston by the pressure of the fluid in said chamber, and enclosed means located on the opposite side of said piston to receive the liquid before being placed under pressure and for accumulating the pressure of the pressure fluid.

7. In combination, a casing having a chamber therein, adapted to contain a fluid under pressure, a piston for the chamber, one side of which is adjacent to the fluid under pressure, having a circular extension on the side of said piston adjacent to said chamber, an annular resilient sealing member supported on said extension, having a cylindrical peripheral flange adapted to seal the piston by the pressure of the fluid in said chamber, and enclosed means located on the opposite side of said piston to receive the liquid before being placed under pressure and for accumulating the pressure of the pressure fluid.

8. In combination, a casing, a cylindrical member movable therein, said casing having a chamber adjacent to the cylindrical member, adapted to receive the fluid under pressure, and a resilient sealing ring for the cylindrical member, adapted to receive a pressure laterally on said ring, said member being constructed with a flange spaced from the chamber wall and overlying the sealing ring so as to restrict the pressure of the ring between the cylindrical member and said wall.

9. In a pressure accumulator, the combination of a plunger adapted to supply liquid under pressure, an actuator therefor adapted to store up pressure liquid on one side of the plunger, said plunger having a liquid seal located immediately between the stored liquid and the sliding surface of said plunger, and a filter located on the other side of said plunger in the path of the liquid in passing from its source of supply to the plunger to be supplied under pressure thereby.

10. In a pressure accumulator, the combination of a plunger adapted to supply liquid under pressure, a cylinder for the same, and an accumulator therefor comprising a plurality of compressible springs adapted to store up pressure as applied to the plunger as well as liquid to be supplied by the plunger, said plunger having a dished spring support within the accumulator, within the dished portion of which the cylinder extends.

EDWARD A. ROCKWELL.